United States Patent
Zhu et al.

(10) Patent No.: US 11,418,689 B2
(45) Date of Patent: **\*Aug. 16, 2022**

(54) DISPLAY DEVICE AND ELECTRONIC APPARATUS WITH 3D CAMERA MODULE

(71) Applicant: SHENZHEN GUANGJIAN TECHNOLOGY CO., LTD., Guangdong (CN)

(72) Inventors: Li Zhu, Shenzhen (CN); Fanglu Lyu, Shenzhen (CN); Bo Wang, Shenzhen (CN)

(73) Assignee: Shenzhen Guangjian Technology Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/149,655

(22) Filed: Jan. 14, 2021

(65) Prior Publication Data

US 2021/0136268 A1 May 6, 2021

Related U.S. Application Data

(63) Continuation of application No. 16/669,297, filed on Oct. 30, 2019, now Pat. No. 10,931,860.

(30) Foreign Application Priority Data

Jan. 17, 2019 (CN) .......................... 201910044209.0

(51) Int. Cl.
*H04N 5/225* (2006.01)
*G06T 7/521* (2017.01)
(Continued)

(52) U.S. Cl.
CPC ........... *H04N 5/2257* (2013.01); *G06T 7/521* (2017.01); *H04N 5/2254* (2013.01); *H04N 13/25* (2018.05);
(Continued)

(58) Field of Classification Search
CPC .... H04N 7/144; H04N 5/2257; H04N 13/296; H04N 13/254; H04N 13/25;
(Continued)

(56) References Cited

U.S. PATENT DOCUMENTS 4,945,408 A 7/1990 Medina
9,392,219 B2 7/2016 Robinson et al.
(Continued)

FOREIGN PATENT DOCUMENTS

CN 107678225 A 2/2018
CN 108627936 A 10/2018
(Continued)

OTHER PUBLICATIONS

Josip et al. "Time-of-flight (ToF) measurement using pulse lasers" OSRAM Opto Semiconductors, Application Note No. AN 106. Nov. 15, 2018, 22 Pages. (Year: 2018).*
(Continued)

*Primary Examiner* — Nathnael Aynalem
(74) *Attorney, Agent, or Firm* — Sheppard Mullin Richter & Hampton LLP

(57) ABSTRACT

Display devices and electronic apparatuses with 3D camera modules are provided. An exemplary device comprises a display and a 3D camera module, wherein the 3D camera module comprises a depth camera module disposed at a backlight side of the display; the depth camera module comprises an edge-emitting laser and an imaging module; the edge-emitting laser is configured for emitting laser light, for the emitted laser light to penetrate the display to reach an object; and the imaging module is configured for receiving laser light reflected by the object that penetrates the display, and obtaining a depth image of the object based on the reflected laser light.

19 Claims, 6 Drawing Sheets

(51) Int. Cl.
  *H04N 13/254* (2018.01)
  *H04N 13/296* (2018.01)
  *H04N 13/25* (2018.01)
  *G02B 27/10* (2006.01)

(52) U.S. Cl.
  CPC ......... *H04N 13/254* (2018.05); *H04N 13/296* (2018.05); *G02B 27/10* (2013.01); *G06T 2207/10028* (2013.01)

(58) Field of Classification Search
  CPC .... H04N 5/2254; H04N 7/142; H04N 5/2256; G06T 7/521; G02B 27/10; G01B 11/22
  USPC ............ 348/47–48, 382; 346/107.2; 356/610
  See application file for complete search history.

(56) References Cited

U.S. PATENT DOCUMENTS

| | | | |
|---|---|---|---|
| 9,577,406 | B2 | 2/2017 | Canumalla et al. |
| 9,769,459 | B2* | 9/2017 | Thompson ............ H04N 13/254 |
| 10,721,420 | B2* | 7/2020 | Winer ...................... G06T 7/521 |
| 2007/0120879 | A1 | 5/2007 | Kanade et al. |
| 2008/0106746 | A1 | 5/2008 | Shpunt et al. |
| 2009/0141116 | A1 | 6/2009 | Kanade et al. |
| 2014/0240464 | A1 | 8/2014 | Lee |
| 2015/0138325 | A1 | 5/2015 | Seo |
| 2015/0229912 | A1 | 8/2015 | Masalkar et al. |
| 2015/0300816 | A1 | 10/2015 | Yang et al. |
| 2015/0380897 | A1 | 12/2015 | Canumalla et al. |
| 2016/0069999 | A1* | 3/2016 | Lee ....................... G01S 17/894 356/5.01 |
| 2017/0324949 | A1 | 11/2017 | Chen et al. |
| 2018/0077384 | A1 | 3/2018 | Goldman et al. |
| 2018/0332273 | A1 | 11/2018 | Cho et al. |
| 2019/0089880 | A1 | 3/2019 | Murao |
| 2019/0310542 | A1 | 10/2019 | Yang |
| 2020/0275000 | A1 | 8/2020 | Zhu et al. |
| 2020/0408971 | A1* | 12/2020 | Zhu .................... G02B 27/4272 |
| 2020/0409163 | A1* | 12/2020 | Zhu ....................... G02B 5/1866 |
| 2021/0136268 | A1 | 5/2021 | Zhu et al. |

FOREIGN PATENT DOCUMENTS

| | | |
|---|---|---|
| CN | 108701233 A | 10/2018 |
| CN | 108828786 A | 11/2018 |
| CN | 109143607 A | 1/2019 |
| CN | 109167904 A | 1/2019 |
| CN | 109188711 A | 1/2019 |
| CN | 109218588 A | 1/2019 |
| CN | 110166761 A | 8/2019 |
| CN | 110213559 A | 9/2019 |
| CN | 210168142 U | 3/2020 |

OTHER PUBLICATIONS

PCT International Search Report and the Written Opinion dated Apr. 8, 2020, issued in related International Application No. PCT/CN2020/070826, with partial English translation (12 pages).

Osram Opto Semiconductors, "SPL PL 90 Laser Diode Rangefinders", published Sep. 19, 2018 (3 pages).

Josip et al., Osram Opto Semiconductors, "Time-of-flight (ToF) Measurement Using Pulse Lasers", Application Note No. AN 106, Nov. 15, 2018 (22 pages).

Non-Final Office Action dated Jan. 31, 2020, issued in related U.S. Appl. No. 16/669,297 (17 pages).

Final Office Action dated May 20, 2020, issued in related U.S. Appl. No. 16/669,297 (15 pages).

Advisory Action dated Aug. 24, 2020, issued in related U.S. Appl. No. 16/669,297 (8 pages).

PCT International Preliminary Report on Patentability dated Jul. 29, 2021, issued in related International Application No. PCT/CN2020/070826, with English translation (12 pages).

First Search dated Sep. 7, 2020, issued in related Chinese Application No. 201910440517.5 (1 page).

First Office Action dated Sep. 22, 2020, issued in related Chinese Application No. 201910440517.5, with English machine translation (14 pages).

Second Office Action dated Mar. 23, 2021, issued in related Chinese Application No. 201910440517.5, with English machine translation (15 pages).

Supplementary Search dated Jun. 3, 2021, issued in related Chinese Application No. 201910440517.5 (1 page).

Notice of Allowance dated Oct. 28, 2020, issued in related U.S. Appl. No. 16/669,297 (8 pages).

Extended European Search Report dated Jan. 28, 2022, issued in related European Patent Application No. 20748003.9 (8 pages).

* cited by examiner

DISPLAY DEVICE AND ELECTRONIC APPARATUS WITH 3D CAMERA MODULE

CROSS REFERENCE TO RELATED APPLICATION

This application is a continuation of U.S. patent application Ser. No. 16/669,297, filed on Oct. 30, 2019, which claims priority to the Chinese Patent Application No. 201910044209.0, filed Jan. 17, 2019. The content of all of the above-identified applications are hereby incorporated by reference in the entirety.

TECHNICAL FIELD

This disclosure relates to the display technical field, and more specifically, to a display device and an electronic apparatus with a 3D camera module.

BACKGROUND

With the development of the market, consumers are increasingly demanding on the display effect of the display screen, which not only requires design diversification, but also requires a higher screen ratio. Full screen technologies, with ultra-narrow bezel and even bezel-less design, achieve a screen ratio of more than 90%, which maximizes the display area with the same device body, making the display effect more amazing. To install a depth camera module and other device components in a 3D camera module, existing full screen-based structural designs configure a non-display area, that is, a notch area, at the top of the display panel. However, this still impacts the full-screen experience of the display device's users.

SUMMARY

In some embodiments, an imaging device comprises: at least one edge-emitting laser disposed at a backlight side of a display, wherein the at least one edge-emitting laser is configured for emitting laser light to penetrate the display from the backlight side of the display to reach an object; and an imaging module disposed at the backlight side of the display, wherein the imaging module is configured for receiving laser light reflected by the object that re-penetrates the display from a light-emerging side of the display, and obtaining a depth image of the object based on the reflected laser light.

In some embodiments, the imaging device further comprises a driver circuit coupled to the edge-emitting laser and the imaging module, wherein the driver circuit is configured for controlling the edge-emitting laser and the imaging module to turn on or off, and controlling a drive current of the edge-emitting laser to control an output optical power of the edge-emitting laser.

In some embodiments, the imaging device further comprises a beam splitting device disposed between the edge-emitting laser and the display, wherein the beam splitting device is configured for splitting the laser light emitted by the edge-emitting laser into multiple randomly distributed laser beams.

In some embodiments, the imaging module is configured for obtaining a depth image of a surface of the object based on a spot pattern of the received laser light reflected by the object, the spot pattern corresponding to at least some of the randomly distributed laser beams.

In some embodiments, the imaging device further comprises an optical lens disposed between the beam splitting device and the display, wherein the optical lens is configured for aligning the emitted laser light.

In some embodiments, the imaging module is configured for obtaining a depth image of a surface of the object based on a time delay or phase shift of the received laser light reflected by the object.

In some embodiments, the imaging device further comprises a diffuser disposed between the beam splitting device and the display, wherein the diffuser is configured for diffusing the emitted laser light into flood light.

In some embodiments, the beam splitting device comprises a nanophotonic chip, a diffractive optics element, or a coded structured light photomask.

In some embodiments, the imaging device further comprises a processing module, wherein: the 3D camera module further comprises a 2D imaging module; the 2D imaging module is configured for capturing a 2D image of the object; and the processing module is configured for obtaining a 3D image of the object based on the depth image and the 2D image.

In some embodiments, an area of the display where the laser light penetrates or re-penetrates is a display area.

In some embodiments, a display device comprises a display and a 3D camera module, wherein: the 3D camera module comprises a depth camera module disposed at a backlight side of the display; the depth camera module comprises an edge-emitting laser and an imaging module; the edge-emitting laser is configured for emitting laser light, for the emitted laser light to penetrate the display to reach an object to be imaged; and the imaging module is configured for receiving laser light reflected by the object to be imaged that penetrates the display, and obtaining a depth image of the object to be imaged based on the reflected laser light.

In some embodiments, the depth camera module comprises a beam splitting device disposed between the edge-emitting laser and the display; the beam splitting device is configured for splitting the laser light emitted by the edge-emitting laser into multiple randomly distributed laser beams.

In some embodiments, the depth camera module comprises a driver circuit coupled to the edge-emitting laser and the imaging module; the driver circuit is configured for controlling the edge-emitting laser and the imaging module to turn on or off simultaneously, and controlling a drive current of the edge-emitting laser to control an output optical power of the edge-emitting laser.

In some embodiments, the imaging module is a first imaging module; the first imaging module is configured for obtaining a depth image of a surface of the object to be imaged based on a spot pattern of the received laser light reflected by the object to be imaged.

In some embodiments, an optical lens is disposed between the beam splitting device and the display; the optical lens is configured for aligning the emitted laser light.

In some embodiments, the imaging module is a second imaging module; the second imaging module is configured for obtaining a depth image of a surface of the object to be imaged based on a time delay or phase shift of the received laser light reflected by the object to be imaged.

In some embodiments, a diffuser is disposed between the beam splitting device and the display, the diffuser is configured for diffusing the emitted laser light into flood light.

In some embodiments, the depth camera module comprises a processing module; the 3D camera module further comprises a 2D imaging module; the 2D imaging module is configured for capturing a 2D image of the object to be imaged; the processing module is configured for obtaining a 3D image of the object to be imaged based on the depth image and the 2D image.

In some embodiments, the beam splitting device is a nanophotonic chip, a diffraction grating, or a coded structured light photomask.

In some embodiments, an area of the display corresponding to the edge-emitting laser is a display area or a non-display area.

In some embodiments, an electronic apparatus comprises any of the above-described devices.

The disclosed embodiments have one or more technical effects. In some embodiments, with the disclosed imaging device, display device, or electronic apparatus with a 3D camera module, since the output optical power of the edge-emitting laser is high, the optical power of the laser light penetrating a display is high even if the display has a low transmittance rate. Therefore, the depth camera module may be disposed at the backlight side of the display, obviating the need for configuring a non-display area on top of the display device for installing the depth camera module. Thus, the aesthetics of the display device and full-screen user experience are improved.

BRIEF DESCRIPTION OF THE DRAWINGS

To more clearly describe technical solutions in the embodiments of the present application or current technologies, the accompanying drawings to be used in the following description of the implementation manners or current technologies will be briefly introduced. Obviously, the accompanying drawings described below are merely some embodiments of the present application. To people skilled in the art, other drawings can be obtained according to these drawings without creative effort.

DETAILED DESCRIPTION

Existing depth camera modules use Vertical Cavity Surface Emitting Lasers (VCSELs) as light source. However, due to the low output optical power of VCSELs, when the light transmittance of the display is low, the optical power of the laser light penetrating the display panel is low, and an effective depth image cannot be obtained. It is thus technically challenging to provide depth image capturing based on light source originating from behind a display such as a mobile phone screen. Therefore, some alternative solutions provide a non-display area, that is, a notch area, at the top of the display panel, and drill holes in the non-display area to install the VCSELs. The notch area takes up portions of the display screen for non-display uses, and negatively affects the full-screen experience of the display device and the performance of depth image capture.

In some embodiments, a display device comprising a display and a 3D camera module is provided. The 3D camera module comprises a depth camera module disposed at a backlight side of the display. The depth camera module comprises an edge-emitting laser and an imaging module. The edge-emitting laser is configured for emitting laser light, for the emitted laser light to penetrate the display to reach an object. The imaging module is configured for receiving laser light reflected by the object that penetrates the display, and obtaining a depth image of the object based on the reflected laser light.

In some embodiments, since the output optical power of the edge-emitting laser is high, the optical power of the laser light penetrating a display is high even if the display has a low transmittance rate. Therefore, the depth camera module may be disposed at the backlight side of the display, obviating the need for configuring a non-display area on top of the display device for installing the depth camera module. Thus, the full-screen experience is improved.

Figure 1:
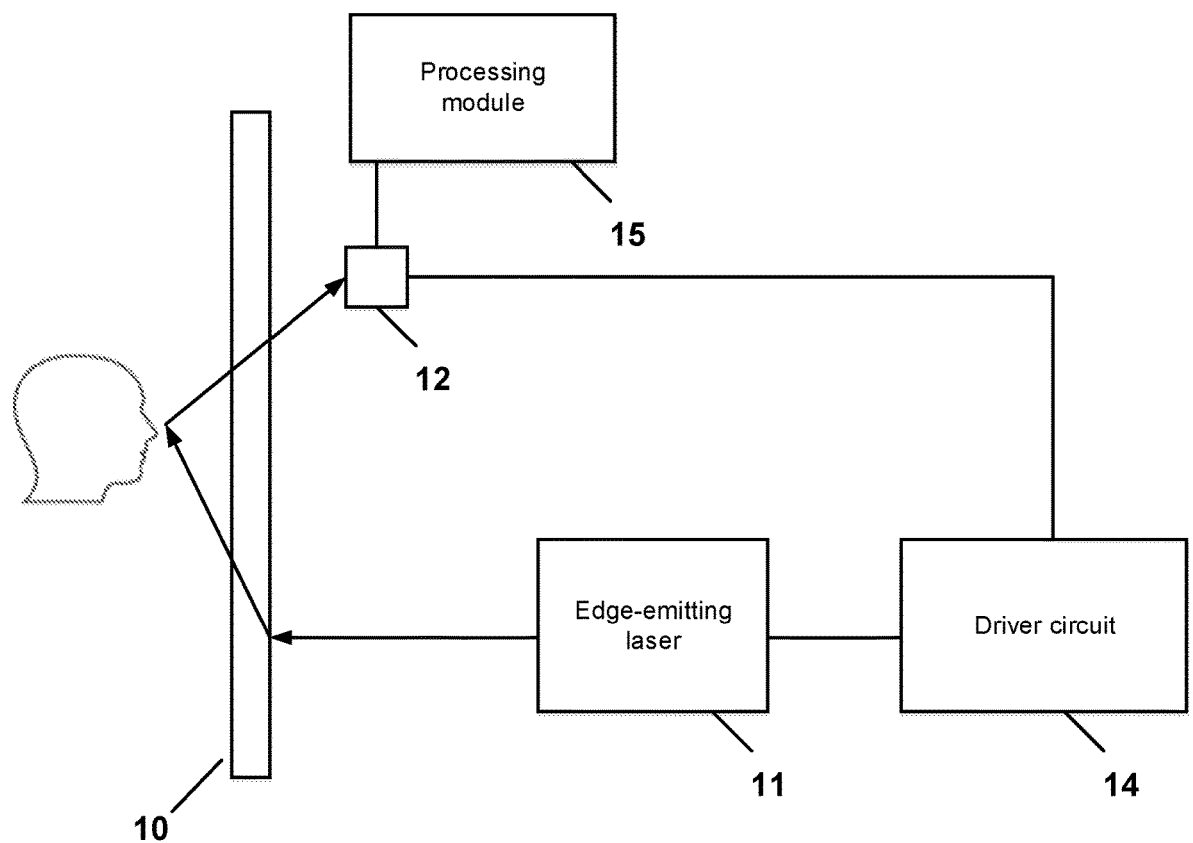
FIG. 1 is a structural diagram of a display device according to the embodiments of the present disclosure.

As shown in FIG. 1, in some embodiments, a display device may comprise a display 10 (e.g., a display panel) and a 3D camera module. The display may be based on various technologies. The 3D camera module includes a depth camera module disposed at the backlight side of the display 10. In some embodiments, the depth camera module may be an infrared camera module, and the laser may be an infrared laser that emits infrared laser light.

In some embodiments, the light-emerging side of the display may be the side where images are displayed, and the backlight side is the side where no image is displayed. For example, the light-emerging side of a mobile phone's display is configured for displaying images to users, and the emerging light refers to the light displaying the images. The backlight side of the mobile phone's display is often buried inside the phone case and is exposed after opening up the phone case. In one example, for an electronic device facing up, the depth camera module may be located below the display 10, that is, may be disposed under the screen, rather than taking up portions of the display 10, thus obviating drilling at a non-display area at the top of the display 10 to install the depth camera module.

In some embodiments, the depth camera module includes an edge-emitting laser (EEL) 11 and an imaging module 12. The imaging module 12 may comprise various hardware and/or software coupled to one another, such as a detector matching the EEL 11, a processor and a non-transitory computer-readable storage medium, etc. The storage medium may store instructions that when executed by the processor cause the processor to generate an image based on signals obtained by the detector. In one embodiment, the edge-emitting laser 11 and the imaging module 12 are both located at the backlight side of the display 10, and the light outlet of the edge-emitting laser 11 is disposed toward the display 10, so that laser light may be emitted towards and penetrate the display panel 10 to illuminate on an object. The object is located at the light outlet side of the display 10. The light inlet of the imaging module 12 is disposed toward the display 10, such that the laser light reflected by the object re-penetrates the display 10 to enter the imaging module 12. For example, the EEL may be disposed inside a mobile phone's packaging case, emitting laser light from the inside of the packaging case, passing the display screen towards the outside environment. When an object (e.g., a user's face) reflects the emitted laser light, the reflected laser light may travel back into the packaging case to reach the imaging module 12 disposed inside the packaging case. The imaging module 12 may generate an image of the object based at least on the reflected laser light.

In some embodiments, an imaging device may comprise: at least one edge-emitting laser 11 disposed at a backlight side of a display 10 and the imaging module 12 disposed at the backlight side of the display 10. The at least one edge-emitting laser 11 is configured for emitting laser light to penetrate the display 10 from the backlight side of the display to reach an object, and the imaging module 12 is configured for receiving laser light reflected by the object that re-penetrates the display 10 from a light-emerging side of the display, and obtaining a depth image of the object based on the reflected laser light.

In some embodiments, the edge-emitting laser 11 is configured for emitting laser light, for the emitted laser light to penetrate the display to reach the object; the imaging module 12 is configured for receiving laser light reflected by the object that penetrates the display 10, and obtaining a depth image of the object based on the reflected laser light. The depth image includes depth information of different regions of the surface of the object.

In some embodiments, since the output optical power of the edge-emitting laser is high, the optical power of the laser light penetrating the display is high even when in face of a display having a low transmittance rate. Therefore, the depth camera module may be disposed at the backlight side of the display, obviating the need for configuring a non-display area on top of the display device for installing the depth camera module. Thus, the full-screen experience is improved.

Moreover, since the edge-emitting laser 11 and the imaging module 12 are both disposed at the backlight side of the display 10, the arrangement of the edge-emitting laser 11 and the imaging module 12 has various possibilities. The distance between the edge-emitting laser 11 and the imaging module 12 may be increased to improve the imaging precision of the depth camera module.

Figure 2:
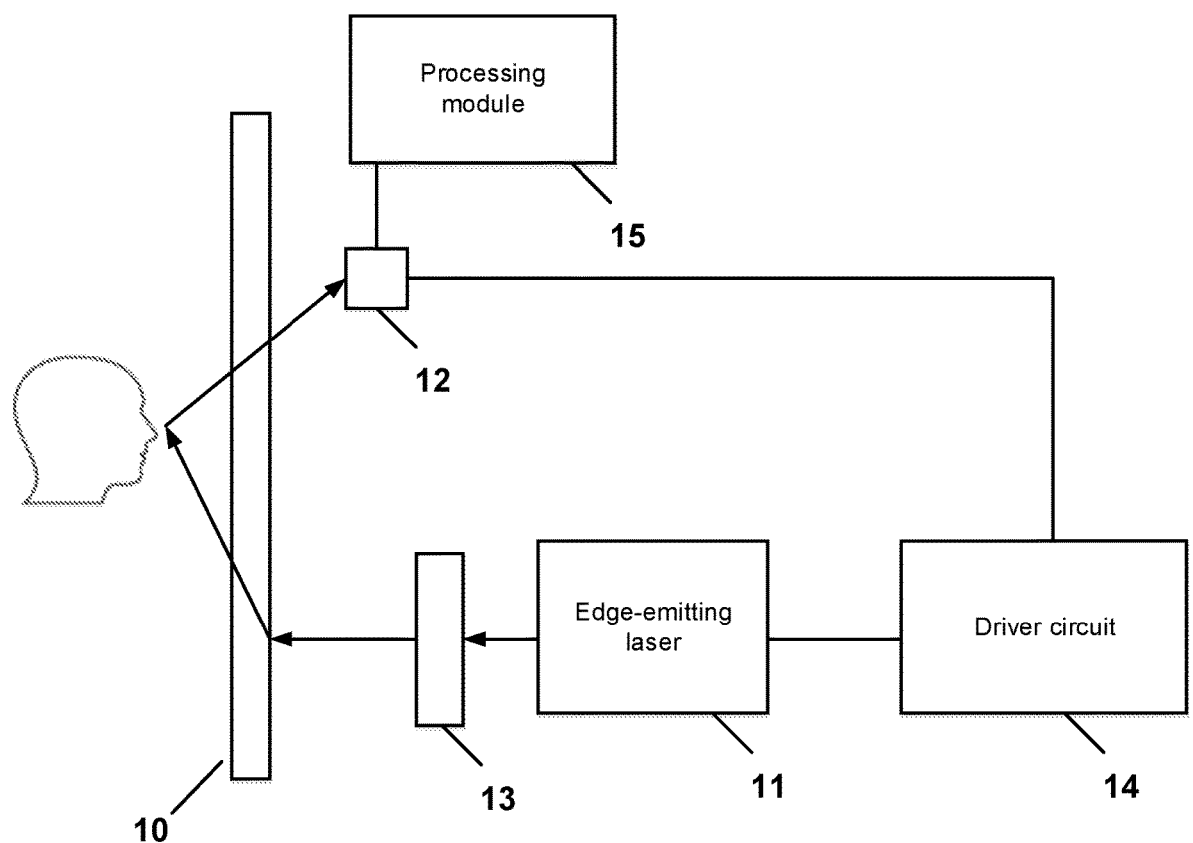
FIG. 2 is a structural diagram of another display device according to the embodiments of the present disclosure.

In some embodiments, as shown in FIG. 2, the depth camera module may further comprise a beam splitting device 13 disposed between the edge-emitting laser 11 and the display 10. The beam splitting device 13 (e.g., beam splitter, splitter cable, etc.) is configured for splitting the laser light emitted by the edge-emitting laser 11 into multiple randomly distributed laser beams.

In some embodiments, as shown in FIG. 1 and FIG. 2, the depth camera module includes a driver circuit 14 coupled to the edge-emitting laser 11 and the imaging module 12. The driver circuit 14 is configured for controlling the edge-emitting laser 11 and the imaging module 12 to turn on or off (e.g., turn on simultaneously or turn off simultaneously), and controlling a drive current of the edge-emitting laser 11 to control an output optical power of the edge-emitting laser 11. Through controlling the output optical power of the edge-emitting laser 11, the optical power of the laser light that penetrates the display 10 is controlled.

Further, the depth camera module further includes a processing module 15, and the 3D camera module further includes a 2D imaging module. The 2D imaging module is configured for capturing a 2D image of an object. The processing module 15 is configured for obtaining a 3D image of the object based on the depth image captured by the 3D camera module and the 2D image captured by the 2D imaging module.

In some embodiments, if the depth camera module is disposed below the screen, that is, disposed at the backlight side of the display 10, in order to obtain an image of the object (e.g., a human face) that is at the light-emerging side of the display 10. The laser light emitted by the depth camera module may pass through the display panel 10, be reflected by the object, come back through the display panel 10, and be received by the imaging module 12.

Figure 3:
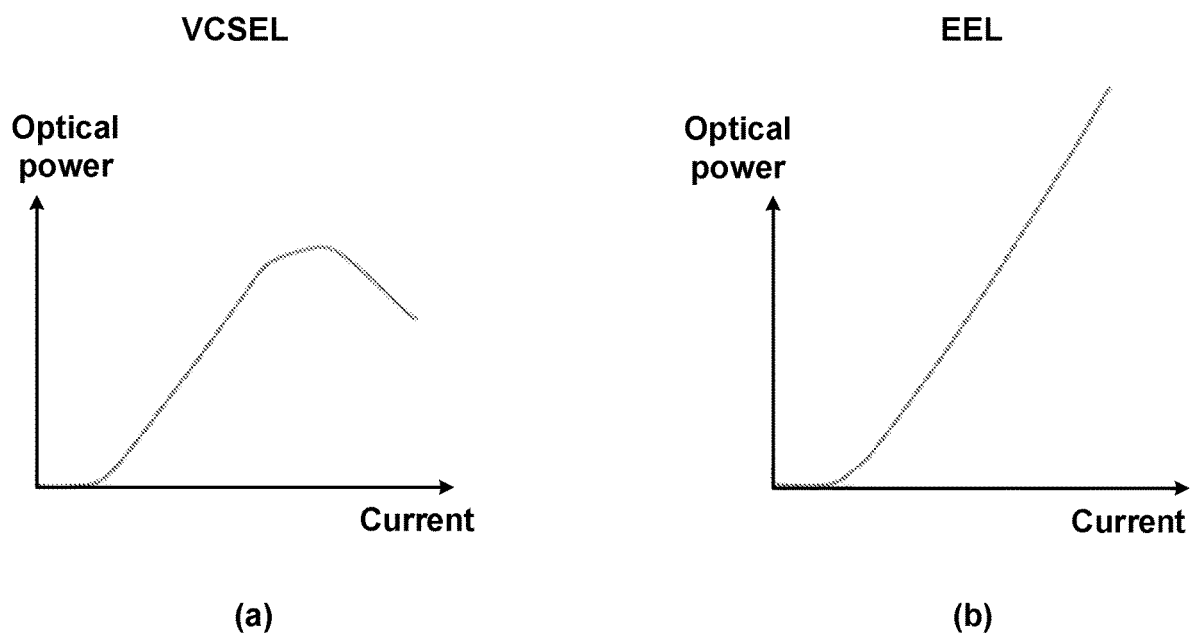
FIG. 3 is a graph of display device optical power v. current of Vertical Cavity Surface Emitting Lasers (VCSEL) and Edge-Emitting Laser (EEL) lasers according to the embodiments of the present disclosure.

The transmittance of the display 10 to the laser may be very low, for example, the transmittance rate of the OLED display 10 to the infrared laser light may be less than 5%, the transmittance of even specially designed and processed OLED display panel 10 to the infrared laser is only 30%. The total transmittance after passing through the screen twice is only 30%*30%=9%. Therefore, the output optical power of the existing VCSELs must be increased by more than 10 times in order to allow the depth camera module to work normally. However, the output optical power of VCSELs may not be increased by more than ten times. As shown in FIG. 3, FIG. 3 shows the optical power-current curve of the edge-emitting laser 11 as EELs or VCSELs. Since VCSELs tend to heat up when the driving current is large, the output optical power decreases as the driving current increases. As a result, the maximum optical power of VCSELs is only 10 mW, and the laser light emitted by the VCSELs after passing through the display 10 is low. That is, the existing VCSELs cannot ensure that the depth camera module disposed at the backlight side of the display panel 10 works properly by increasing the output optical power. As shown in FIG. 3, the output optical power of the edge-emitting laser 11 increases as the driving current increases, and the maximum peak output optical power can reach several tens of W. Therefore, the depth camera module may be disposed at the backlight side of the display 10. That is, the non-display area at the top, that is, the notch area, may be omitted to improve the full-screen experience.

In some embodiments, areas of the display 10 where the emitted laser light penetrates or the reflected laser light re-penetrates may correspond to display or non-display areas. In one embodiment, the areas corresponding to the display 10 and the edge-emitting laser 11 are respectively a display area and a non-display area. That is, the edge-emitting laser 11 may emit laser light from an area of display 10 that has pixels or the like structures, that is, the display area. Alternatively, the edge-emitting laser 11 may emit laser light from an area of the display panel 10 that has a black matrix, that is, the non-display area.

In one embodiment, the areas of the display 10 corresponding to the edge-emitting laser 11 and the imaging module 12 are display areas. Alternatively, the areas corresponding to the edge-emitting laser 11 and the imaging module 12 are non-display areas. Alternatively, the area corresponding to the edge-emitting laser 11 is a display area, the area corresponding to the imaging module 12 is a non-display area. Alternatively, the area corresponding to the edge-emitting laser 11 is a non-display area, and the area corresponding to the imaging module 12 is a display area.

In some embodiments, regardless of whether the area corresponding to the edge-emitting laser 11 or the imaging module 12 is a display area or a non-display area, in order to increase the laser transmittance and improve the imaging effect of the depth image, an area of the display 10 corresponding to the edge-emitting laser 11 may be specially designed and processed, and an area of the display panel 10 corresponding to the imaging module 12 may be specially designed and processed. The special design and processing here may include a transparency processing of the array substrate of the display 10 or a reduction of the density of the metal traces on the display 10 to improve the transparency and the like of the area.

In some embodiments, to dispose the depth camera module at the backlight side of the display panel 10, the drive current may be increased via the drive circuit 14, and the pulse width of the edge-emitting laser 11 may be reduced, such that the optical power of the edge-emitting laser 11 may be greatly improved while the total pulse energy of the edge-emitting laser 11 is kept substantially unchanged, which satisfies the optical power safety limit for human eyes.

Figure 4:
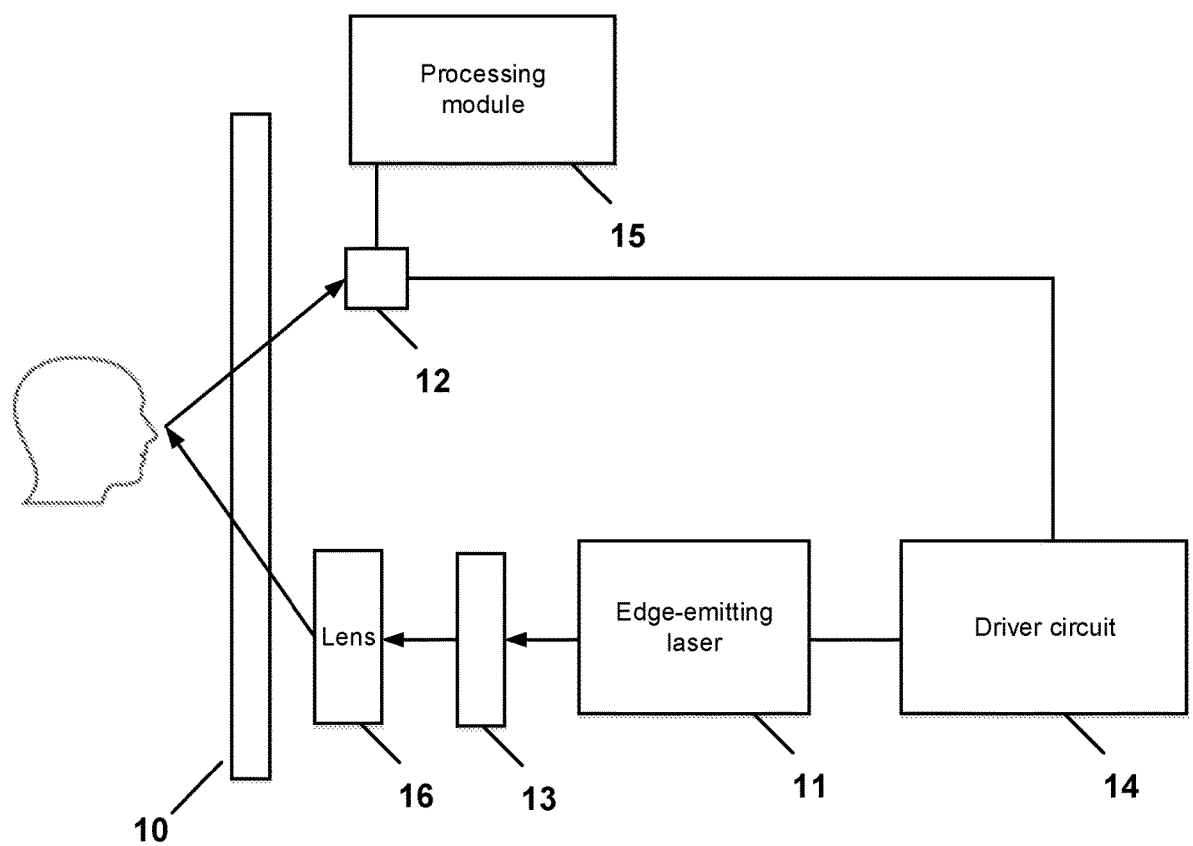
FIG. 4 is a structural diagram of a display device according to an embodiment of the present disclosure.

In some embodiments, as shown in FIG. 4, an optical lens 16 is further disposed between the beam splitting device 13 and the display 10; the optical lens 16 is configured for aligning the emitted laser light, and irradiating the collimated laser light on the display 10. The imaging module 12 is a first imaging module. Optionally, the first imaging module is an infrared camera. The first imaging module obtains a depth image of the surface of the object based on a spot pattern of the received laser light reflected by the object.

Figure 5:
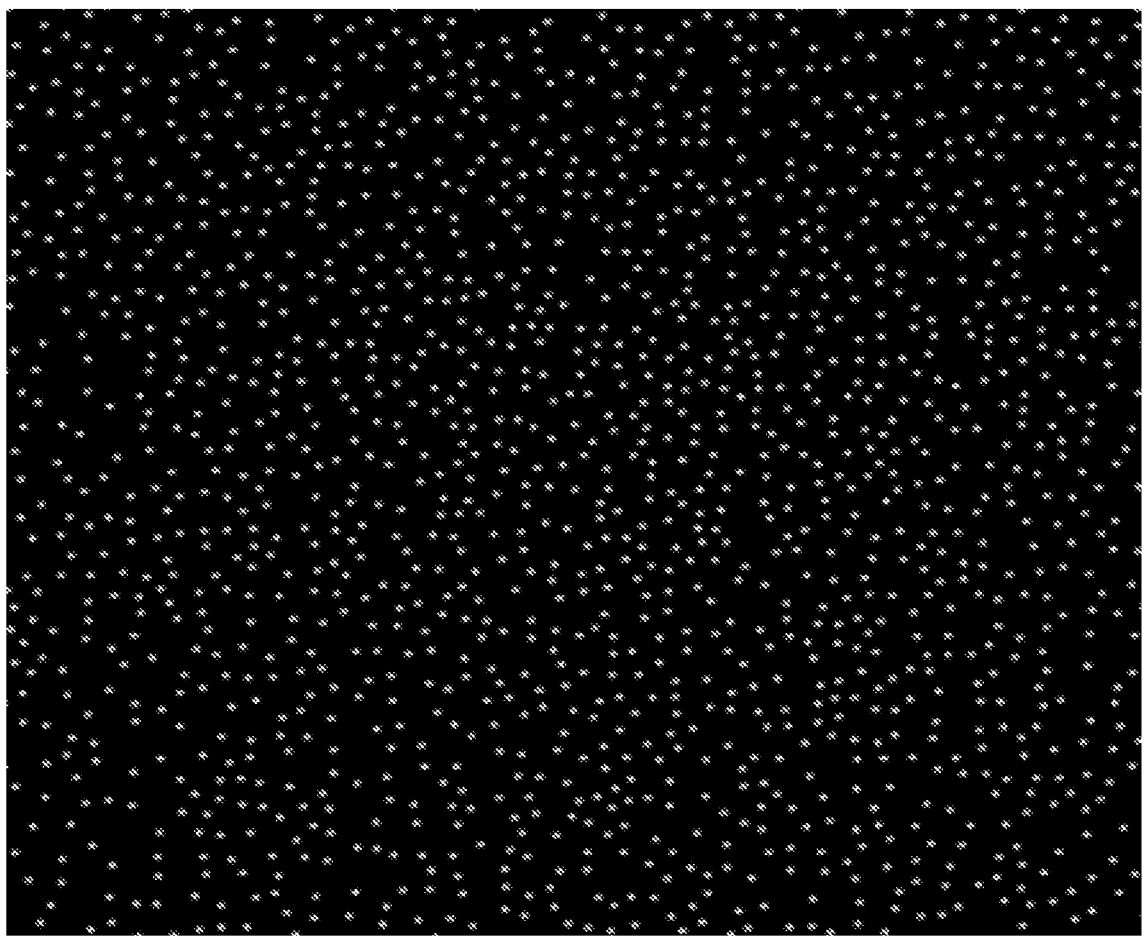
FIG. 5 is a spot pattern diagram of multiple laser beams according to the embodiments of the present disclosure.

In some embodiments, the beam splitting device 13 may divide the laser light emitted by the edge-emitting laser 11 into a plurality of randomly distributed laser beams. When these laser beams are irradiated on a plane, a spot pattern as shown in FIG. 5 is formed. When a plurality of laser beams are irradiated on the object, the spot pattern may be deformed or displaced. After the first imaging module captures the spot pattern on the surface of the object, the depth image of the surface of the object is obtained according to the deformation or displacement of the spot pattern. That is, depth information of ruggedness of the surface of the object is obtained. The processing module 15 can obtain a 3D image of the object according to the depth image and the 2D image. In some embodiments, the imaging module may obtain a depth image of a surface of the object based on the spot pattern of the received laser light reflected by the object, the spot pattern corresponding to at least some of the randomly distributed laser beams.

Figure 6:
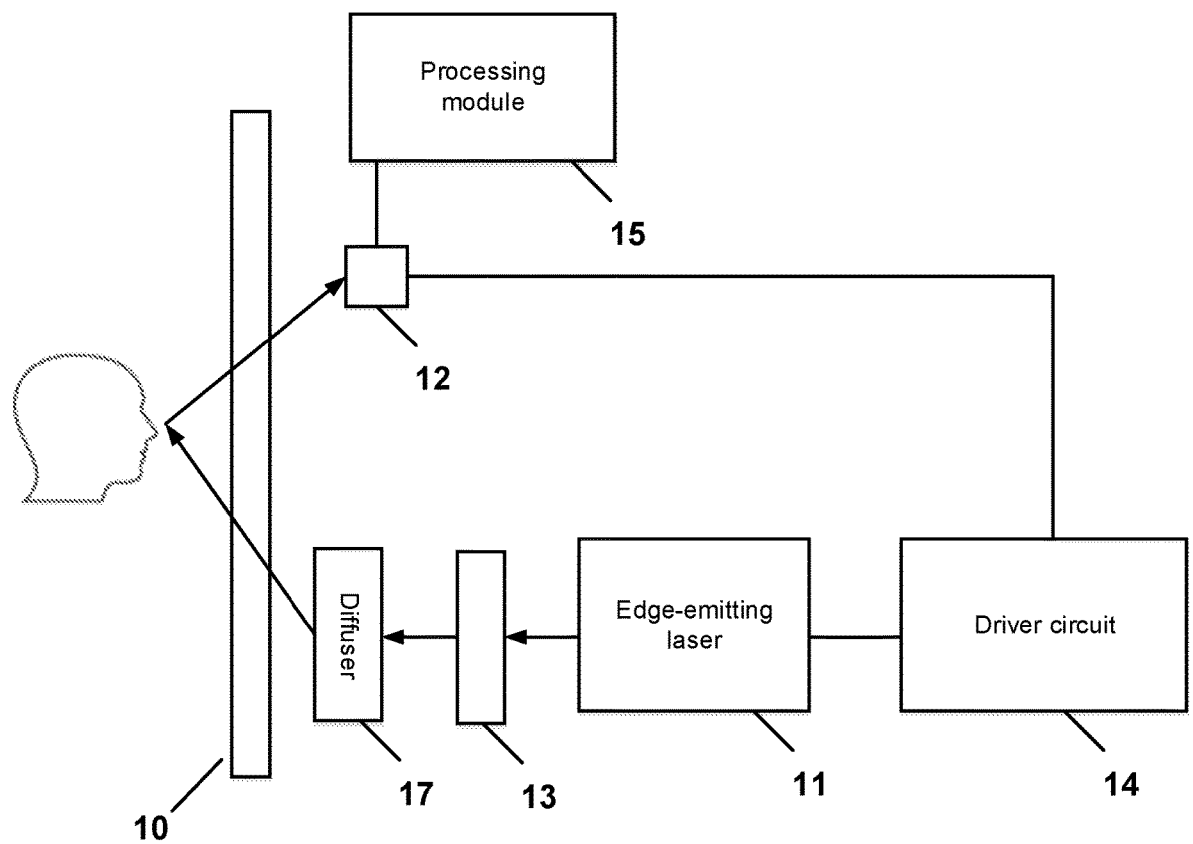
FIG. 6 is a structural diagram of another display device according to an embodiment of the present disclosure.

In some embodiments, as shown in FIG. 6, a diffuser 17 is further disposed between the beam splitting device 13 and the display 10; the diffuser 17 is configured to diffuse the laser light emitted from the beam splitting device 13 to flood the laser light onto the display 10. The imaging module is a second imaging module. Optionally, the second imaging module is a TOF (Time of Flight) camera. The second imaging module obtains a depth image of the surface of the object according to the time delay or phase shift of the received laser light reflected by the object. That is, the second imaging module obtains a depth image of the surface of the object based on the time delay between the time when the laser light is emitted and the time when the laser light is received, or according to the phase difference between the emitted laser light and the received laser light. Thereafter, the processing module 15 may obtain a 3D image of the object according to the depth image and the 2D image.

In some embodiments, the beam splitting device 13 may be a nanophotonic chip, or a diffractive optics element (DOE), or a coded structured light photomask, etc.

In some embodiments, since the output optical power of the edge-emitting laser is high, the optical power of the laser light penetrating a display is high even if the display has a low transmission rate. Therefore, the depth camera module may be disposed at the backlight side of the display, obviating the need for configuring a non-display area on top of the display device for installing the depth camera module. Thus, the full-screen experience is improved.

Moreover, in some embodiments, the 3D camera module may capture a depth image with just one edge-emitting laser 11, which is low-cost. In addition, since edge-emitting laser 11 can be mass-produced, the 3D camera module can also be mass-produced on a large scale. Further, since the substrate thermal impedance of the edge-emitting laser 11 is much smaller than that of VCSEL, the heat dissipation performance of the edge-emitting laser 11 and the 3D camera module is better.

The embodiments further provides an electronic device, which includes the display device provided by any of the above embodiments, and the electronic device may be a mobile phone, a tablet computer, a digital camera, or the like. The electronic device with the 3D camera module does not need to set up a non-display area on the top of the display device to install the depth camera module.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

When a component is referred to as being "fixed" or "disposed" in another component, it can be directly or indirectly on the another component. When a component is referred to as being "coupled" to another component, it can be directly or indirectly coupled to the another component. In addition, the coupling can be for attachment or electric coupling.

The terms "length," "width," "above," "below," "front," "back," "left," "right," "vertical," "horizontal," "top," "bottom," "inside," "outside," and the like orientational or positional relationship are based on the orientation or positional relationship shown in the drawings, and are merely for the convenience of describing the embodiments, rather than indicating or implying that the device or component must be constructed and operated in the particular orientation and configuration and operation, and thus should not to be construed as limiting.

Moreover, the terms "first" and "second" are used for descriptive purposes and are not to be construed as indicating or implying a relative importance or implicitly indicating a number of technical features indicated. Thus, defining "first" and "second" features may explicitly or implicitly indicate one or more of the features.

The invention claimed is:

1. A computer-implemented method for depth imaging, comprising:
    displaying, in a display area of a display, images to a light-emerging side of the display, wherein a total transmittance rate of infrared laser light passing through the display twice is 9% or less;
    controlling an edge-emitting laser at a backlight side of the display to emit infrared light through the display area by increasing an optical power of the laser at the backlight side of the display at least to an extent that the infrared light penetrates the display area of the display from the backlight side of the display to reach an object on the light-emerging side of the display, and that the infrared light reflected by the object re-penetrates the display area of the display again after being reflected by the object;
    determining a pulse width amount;
    reducing a pulse width of the laser by the determined pulse width amount to keep total pulse energy of the laser within a safety limit and substantially unchanged from the increased optical power;
    receiving, at the backlight side of the display, the infrared light reflected by the object that re-penetrates the display through the display area from the light-emerging side of the display; and
    determining a depth image of the object based on the received infrared light after the pulse width is reduced.

2. The method of claim 1, wherein controlling the edge-emitting laser at the backlight side to emit the infrared light through the display area comprises:
    controlling the laser to turn on.

3. The method of claim 1, wherein:
    the infrared light is split into multiple randomly distributed laser beams; and
    increasing the optical power of the laser comprises increasing a drive current.

4. The method of claim 3, wherein determining the depth image of the object comprises determining the depth image of a surface of the object based on a spot pattern of the received infrared light, the spot pattern corresponding to at least some of the multiple randomly distributed laser beams.

5. The method of claim 3, wherein the multiple randomly distributed laser beams are aligned by an optical lens before penetrating the display from the backlight side of the display.

6. The method of claim 3, wherein determining the depth image of the object comprises:
    determining a time delay or phase shift of the received infrared light.

7. The method of claim 3, wherein the multiple randomly distributed laser beams are diffused into flood light before penetrating the display from the backlight side of the display.

8. The method of claim 3, wherein the infrared light is split into multiple randomly distributed laser beams using a nanophotonic chip, a diffractive optics element, or a coded structured light photomask.

9. The method of claim 1, further comprising:
    capturing a 2D image of the object; and
    determining a 3D image of the object based on the depth image and the 2D image.

10. A system for depth imaging, comprising one or more processors and one or more non-transitory computer-readable memories coupled to the one or more processors and configured with instructions executable by the one or more processors to cause the system to perform operations comprising:
    displaying, in a display area of a display, images to a light-emerging side of the display, wherein a total transmittance rate of infrared laser light passing through the display twice is 9% or less;
    controlling an edge-emitting laser at a backlight side of the display to emit infrared light through the display area by increasing an optical power of the laser at the backlight side of the display at least to an extent that the infrared light penetrates the display area of the display from the backlight side of the display to reach an object on the light-emerging side of the display, and that the infrared light reflected by the object re-penetrates the display area of the display again after being reflected by the object;

determining a pulse width amount;

reducing a pulse width of the laser by the determined pulse width amount to keep total pulse energy of the laser within a safety limit and substantially unchanged from the increased optical power;

receiving, at the backlight side of the display, the infrared light reflected by the object that re-penetrates the display through the display area from the light-emerging side of the display; and determining a depth image of the object based on the received infrared light after the pulse width is reduced.

11. The system of claim 10, wherein controlling the edge-emitting laser at the backlight side to emit the infrared light through the display area comprises:

controlling the laser to turn on.

12. The system of claim 10, wherein:

the infrared light is split into multiple randomly distributed laser beams; and increasing the optical power of the laser comprises increasing a drive current.

13. The system of claim 12, wherein determining the depth image of the object comprises determining the depth image of a surface of the object based on a spot pattern of the received infrared light, the spot pattern corresponding to at least some of the multiple randomly distributed laser beams.

14. The system of claim 12, wherein the multiple randomly distributed laser beams are aligned by an optical lens before penetrating the display from the backlight side of the display.

15. The system of claim 12, wherein determining the depth image of the object comprises:

determining a time delay or phase shift of the received infrared light.

16. A non-transitory computer-readable storage medium configured with instructions executable by one or more processors to cause the one or more processors to perform operations comprising:

displaying, in a display area of a display, images to a light-emerging side of the display, wherein a total transmittance rate of infrared laser light passing through the display twice is 9% or less;

controlling an edge-emitting laser at a backlight side of the display to emit infrared light through the display area by increasing an optical power of the laser at the backlight side of the display at least to an extent that the infrared light penetrates the display area of the display from the backlight side of the display to reach an object on the light-emerging side of the display, and that the infrared light reflected by the object re-penetrates the display area of the display again after being reflected by the object;

determining a pulse width amount;

reducing a pulse width of the laser by the determined pulse width amount to keep total pulse energy of the laser within a safety limit and substantially unchanged from the increased optical power;

receiving, at the backlight side of the display, the infrared light reflected by the object that re-penetrates the display through the display area from the light-emerging side of the display; and determining a depth image of the object based on the received infrared light after the pulse width is reduced.

17. The non-transitory computer-readable storage medium of claim 16, wherein controlling the edge-emitting laser at the backlight side to emit the infrared light through the display area comprises:

controlling the laser to turn on.

18. The non-transitory computer-readable storage medium of claim 16, wherein:

the infrared light is split into multiple randomly distributed laser beams; and increasing the optical power of the laser comprises increasing a drive current.

19. The non-transitory computer-readable storage medium of claim 18, wherein determining the depth image of the object comprises determining the depth image of a surface of the object based on a spot pattern of the received infrared light, the spot pattern corresponding to at least some of the multiple randomly distributed laser beams.

* * * * *